United States Patent
Hu et al.

(10) Patent No.: US 10,542,014 B2
(45) Date of Patent: Jan. 21, 2020

(54) AUTOMATIC CATEGORIZATION OF IDPS SIGNATURES FROM MULTIPLE DIFFERENT IDPS SYSTEMS

(71) Applicant: International Business Machines Corporation, Armonk, NY (US)

(72) Inventors: Xin Hu, White Plains, NY (US); Jiyong Jang, White Plains, NY (US); Douglas Lee Schales, Ardsley, NY (US); Marc Philippe Stoecklin, White Plains, NY (US); Ting Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 15/152,004

(22) Filed: May 11, 2016

(65) Prior Publication Data

US 2017/0331841 A1 Nov. 16, 2017

(51) Int. Cl.
*G06F 21/00* (2013.01)
*H04L 29/06* (2006.01)
(Continued)

(52) U.S. Cl.
CPC ........ *H04L 63/1416* (2013.01); *G06F 16/285* (2019.01); *G06F 16/901* (2019.01); *G06N 20/00* (2019.01); *H04L 63/1433* (2013.01)

(58) Field of Classification Search
CPC ............ H04L 63/1416; H04L 63/1433; G06N 99/005; G06N 20/00; G06F 17/30946;
(Continued)

(56) References Cited

U.S. PATENT DOCUMENTS

| 2010/0017870 | A1 | 1/2010 | Kargupta | 726/14 |
| 2011/0246402 | A1* | 10/2011 | Burman | G08B 13/1672 706/14 |

(Continued)

OTHER PUBLICATIONS

"Digital Signatures for the v1.0 Internet Open Trading Protocol (IOTP)", Internet Society RFCs et al.; Sep. 13, 2000, (24 pages).

(Continued)

*Primary Examiner* — Kendall Dolly
(74) *Attorney, Agent, or Firm* — Harrington & Smith

(57) ABSTRACT

Unknown and reference signatures are accessed. The unknown and reference signatures indicate patterns that correspond to known threats to resources (such as computer systems and/or computer networks) in a computer environment and comprise a multitude of descriptive elements having information describing different aspects of a corresponding signature. A set of similarity measures is created of the unknown and reference signatures from different perspectives, each perspective corresponding to a descriptive element. The set of similarity measures are integrated to generate an overall similarity metric. The overall similarity metric is used to find appropriate categories in the reference signatures into which the unknown signatures should be placed. The unknown signatures are placed into the appropriate categories to create a mapping from the unknown signatures to the reference signatures. The mapping is output for use by an IDPS for determining whether a threat has occurred to the resources in the computer environment.

20 Claims, 8 Drawing Sheets

(51) Int. Cl.
*G06N 20/00* (2019.01)
*G06F 16/28* (2019.01)
*G06F 16/901* (2019.01)

(58) Field of Classification Search
CPC . G06F 17/30598; G06F 16/901; G06F 16/285
See application file for complete search history.

(56) References Cited

U.S. PATENT DOCUMENTS

| 2013/0074143 | A1  | 3/2013  | Bu et al. ........................ 726/1 |
| 2013/0139263 | A1* | 5/2013  | Beyah ................ H04L 63/1408 |
|              |     |         | 726/23 |
| 2013/0332467 | A1* | 12/2013 | Bornea ................ G06F 16/951 |
|              |     |         | 707/747 |
| 2017/0262523 | A1* | 9/2017  | Epstein ............. G06F 17/30598 |

OTHER PUBLICATIONS

"Aggregation and correlation of intrusion-detection alerts". H Debar, A Wespi—Recent Advances in Intrusion Detection, 2001, (19 pages).
"Constructing attack scenarios through correlation of intrusion alerts". P. Ning, Y Cui, DS Reeves—Proceedings of the 9th ACM conference on Computer and communications security, 2002, (10 pages).
NIST (National Institute of Standards and Technology), Guide to Intrusion Detection and Prevention Systems (IDPS), Special Publication 800-94, 2007. (127 pages).

\* cited by examiner

AUTOMATIC CATEGORIZATION OF IDPS SIGNATURES FROM MULTIPLE DIFFERENT IDPS SYSTEMS

BACKGROUND

The present invention relates to intrusion detection in networks, and more particularly to categorizing IDPS (Intrusion Detection and Prevention System) signatures.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Intrusion detection is the process of monitoring the events occurring in a network (and/or or computer systems) and analyzing them for signs of possible incidents, which are violations or imminent threats of violation of computer security policies, acceptable use policies, or standard security practices. Intrusion prevention is the process of performing intrusion detection and attempting to stop detected possible incidents. Intrusion Detection and Prevention Systems (IDPS systems) are primarily focused on identifying possible incidents, logging information about them, attempting to stop them, and reporting them to security administrators. It is noted that although the acronym "IDPS" contains "system" as the last part of the acronym, the term "IDPS system" is also used herein, for ease of reference. In addition, organizations use IDPS systems for other purposes, such as identifying problems with security policies, documenting existing threats, and deterring individuals from violating security policies. In fact, IDPS systems have become a necessary addition to the security infrastructure of nearly every organization. See MST (National Institute of Standards and Technology), Guide to Intrusion Detection and Prevention Systems (IDPS), Special Publication 800-94, 2007, for this and additional information about IDPS systems.

For many IDPS systems, signatures are used. Signatures are patterns that indicate known threats. Signature-based detection includes comparing signatures against observed events to identify possible incidents.

Because IDPS systems are sold and implemented by different vendors, and because each vendor has different IDPS signatures, if an organization uses IDPS systems from multiple vendors, these differences between signatures can be difficult to reconcile. It is believed that the lack of standard categorization of IDPS signatures is a potent barrier for aggregating information from multiple IDPS systems, e.g., developed by different vendors. It is possible to manually categorize IDPS signatures. Manually categorizing thousands of signatures, however, can be tedious and error-prone.

SUMMARY

This section is intended to include examples and is not intended to be limiting.

In an exemplary embodiment, a method includes accessing unknown and reference signatures, wherein the unknown and reference signatures indicate patterns that correspond to known threats to resources (such as computer systems and/or computer networks) in a computer environment and comprise a plurality of descriptive elements having information describing different aspects of a corresponding signature. The method includes creating a set of similarity measures of the unknown and reference signatures from different perspectives, each perspective corresponding to a descriptive element, and integrating the set of similarity measures to generate an overall similarity metric. The method additionally includes using the overall similarity metric to find appropriate categories in the reference signatures into which the unknown signatures should be placed, and placing the unknown signatures into the appropriate categories to create a mapping from the unknown signatures to the reference signatures. The method also includes outputting the mapping for use by an intrusion detection and prevention system for determining whether a threat has occurred to the resources in the computer environment.

In another exemplary embodiment, a computer program product is disclosed. The computer program product comprises a computer readable storage medium having program instructions embodied therewith, the program instructions executable by a computer system to cause the computer system to perform the following: accessing unknown and reference signatures, wherein the unknown and reference signatures indicate patterns that correspond to known threats to resources in a computer environment and comprise a plurality of descriptive elements having information describing different aspects of a corresponding signature; creating a set of similarity measures of the unknown and reference signatures from different perspectives, each perspective corresponding to a descriptive element; integrating the set of similarity measures to generate an overall similarity metric; using the overall similarity metric to find appropriate categories in the reference signatures into which the unknown signatures should be placed; placing the unknown signatures into the appropriate categories to create a mapping from the unknown signatures to the reference signatures; and outputting the mapping for use by an intrusion detection and prevention system for determining whether a threat has occurred to the resources in the computer environment.

In an additional exemplary embodiment, a computer system comprises one or more memories comprising computer-readable code, and one or more processors. The one or more processors, in response to executing the computer-readable code, cause the computer system to perform operations comprising the following: accessing unknown and reference signatures, wherein the unknown and reference signatures indicate patterns that correspond to known threats to resources in a computer environment and comprise a plurality of descriptive elements having information describing different aspects of a corresponding signature; creating a set of similarity measures of the unknown and reference signatures from different perspectives, each perspective corresponding to a descriptive element; integrating the set of similarity measures to generate an overall similarity metric; using the overall similarity metric to find appropriate categories in the reference signatures into which the unknown signatures should be placed; placing the unknown signatures into the appropriate categories to create a mapping from the unknown signatures to the reference signatures; and outputting the mapping for use by an intrusion detection and prevention system for determining whether a threat has occurred to the resources in the computer environment.

In a further exemplary embodiment, a method comprises: accessing reference signatures, where the reference signatures have been converted from unknown signatures to the reference signatures by using a mapping between unknown and reference signatures, wherein the unknown and reference signatures indicate patterns that correspond to known threats to resources in a computer environment, and wherein the mapping has been previously determined using the following: creating a set of similarity measures of the unknown and reference signatures from different perspectives, each perspective corresponding to a descriptive element; integrating the set of similarity measures to generate an overall similarity metric; using the overall similarity metric to find appropriate categories in the reference signatures into which the unknown signatures should be placed; and placing the unknown signatures into the appropriate categories to create the mapping from the unknown signatures to the reference signatures; and using the reference signatures, which have been converted from the unknown signatures using the mapping, to determine whether a threat has occurred to the resources in the computer environment.

In an additional exemplary embodiment, a computer system comprises one or more memories comprising computer-readable code, and one or more processors. The one or more processors, in response to executing the computer-readable code, cause the computer system to perform operations comprising the following: accessing reference signatures, where the reference signatures have been converted from unknown signatures to the reference signatures by using a mapping between unknown and reference signatures, wherein the unknown and reference signatures indicate patterns that correspond to known threats to resources in a computer environment, and wherein the mapping has been previously determined using the following: creating a set of similarity measures of the unknown and reference signatures from different perspectives, each perspective corresponding to a descriptive element; integrating the set of similarity measures to generate an overall similarity metric; using the overall similarity metric to find appropriate categories in the reference signatures into which the unknown signatures should be placed; and placing the unknown signatures into the appropriate categories to create the mapping from the unknown signatures to the reference signatures; and using the reference signatures, which have been converted from the unknown signatures using the mapping, to determine whether a threat has occurred to the resources in the computer environment.

In an additional exemplary embodiment, a computer system comprises one or more memories comprising computer-readable code, and one or more processors. The one or more processors, in response to executing the computer-readable code, cause the computer system to perform operations comprising the following: accessing reference signatures, where the reference signatures have been converted from unknown signatures to the reference signatures by using a mapping between unknown and reference signatures, wherein the unknown and reference signatures indicate patterns that correspond to known threats to resources in a computer environment, and wherein the mapping has been previously determined using the following: creating a set of similarity measures of the unknown and reference signatures from different perspectives, each perspective corresponding to a descriptive element; integrating the set of similarity measures to generate an overall similarity metric; using the overall similarity metric to find appropriate categories in the reference signatures into which the unknown signatures should be placed; and placing the unknown signatures into the appropriate categories to create the mapping from the unknown signatures to the reference signatures; and using the reference signatures, which have been converted from the unknown signatures using the mapping, to determine whether a threat has occurred to the resources in the computer environment.

BRIEF DESCRIPTION OF THE SEVERAL VIEWS OF THE DRAWINGS

FIG. 2, which includes both

FIG. 4, which includes both

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, it is believed that the lack of standard categorization of IDPS signatures is a potent barrier for aggregating information from multiple IDPS systems developed by different vendors. While it is possible to manually categorize IDPS signatures, manually categorizing thousands of signatures can be tedious and error-prone.

Exemplary embodiments herein include a method as well as a system and program products that automatically categorize IDPS signatures from different IDPS systems (e.g., from different vendors) to a categorization system of a reference (also called a target) system (e.g., from yet another vendor). Exemplary embodiments herein can provide high quality categorization results as a starting point for analysts such that manual effort can be reduced, e.g., to a minimal extent.

Figure 1:
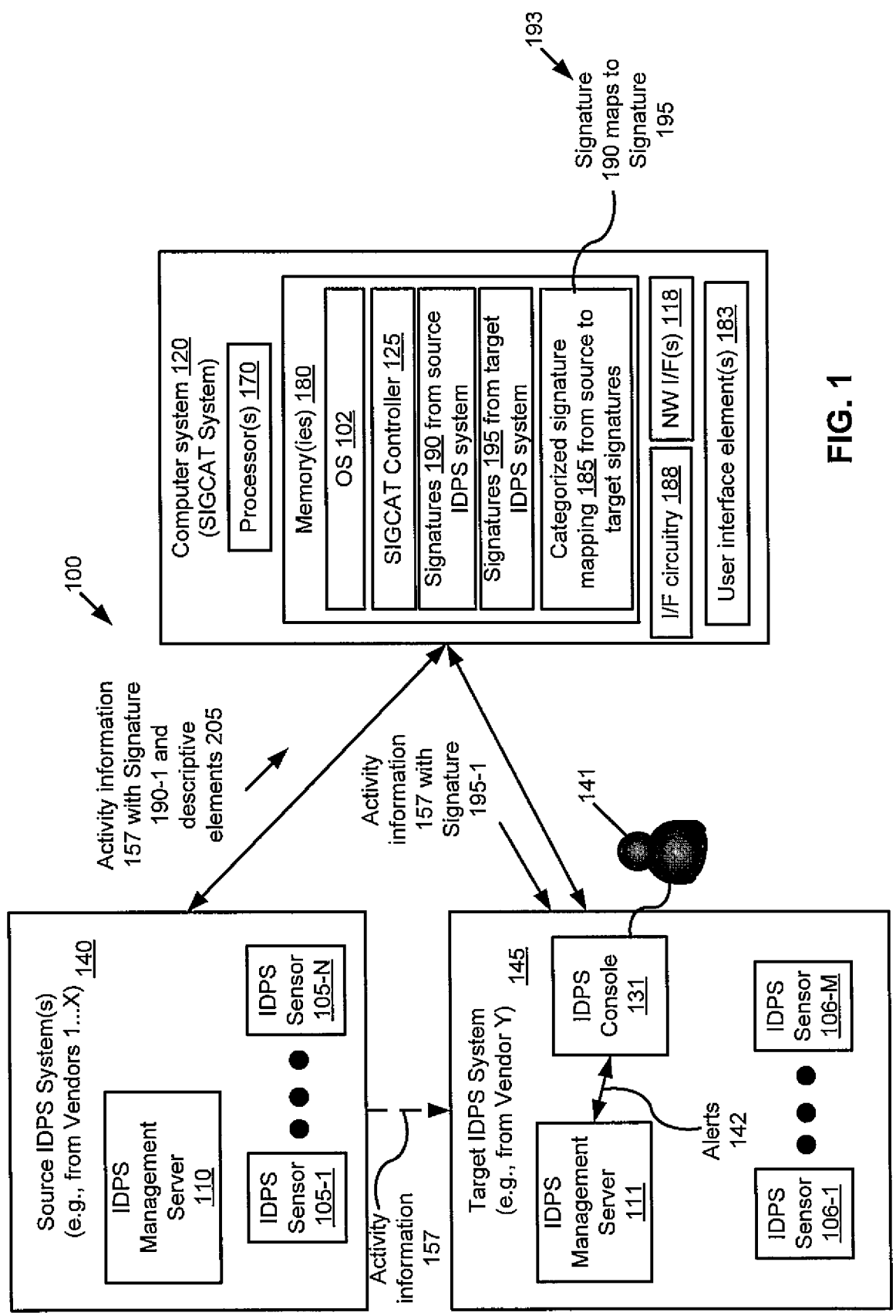
FIG. 1 illustrates an exemplary system used for automatically categorizing IDPS signatures from multiple different IDPS systems in an exemplary embodiment.

More detailed description of exemplary embodiments is presented after an exemplary system is introduced in reference to FIG. 1. Turning to FIG. 1, this figure illustrates an exemplary system 100 used for automatically categorizing IDPS signatures from multiple different IDPS systems in an exemplary embodiment. FIG. 1 illustrates one possible example and there are many others. The system 100 comprises the computer system 120 (referred to also as a SIGCAT system 120), one or more source IDPS systems 140, and a target IDPS system 145. The computer system 120 performs signature categorization (thus, the SIGCAT moniker), and automatically categorizes IDPS signatures from different vendors (illustrated by the one or more source IDPS systems 140) to the categorization system of a reference vendor. The reference vendor in this case is the vendor for the target IDPS system 145. There are 1 . . . X vendors for the source IDPS systems 140 (e.g., each system from one of the X vendors), and the target IDPS system 145 is from a different vendor, illustrated as Vendor Y. Although emphasis is placed herein on different vendors, the instant embodiments are not limited to this and may be used any time there are differences in categorization of IDPS signatures. For instance, the same vendor may have two different IDPS products, both of which use different signature schemes.

The source IDPS system 140 and the target IDPS system 145 are considered to be similar here, but this is just for ease of reference. Also, the components in the systems 140, 145 are merely representative of typical components in such systems and there may be many different versions of such systems with additional or different components. The source IDPS system 140 includes an IDPS management server 110 and IDPS sensors 105-1 through 105-N. Similarly, the target IDPS system 145 includes an IDPS management server 111 and IDPS sensors 106-1 through 106-M. The target IDPS system 145 also includes an IDPS console 131. The IDPS management servers 110, 111 are centralized devices that receive information from the sensors 105, 106, respectively, and manage them. The sensors 105, 106 monitor and analyze activity. The sensors 105, 106 may include or be agents. The term sensor is typically used for IDPS systems that monitor networks, including network-based, wireless, and network behavior analysis technologies. The term agent is typically used for host-based IDPS technologies.

The source IDPS system 140 (e.g., via the IDPS management server 110) forwards activity information 157, and also the corresponding source signature 190-1 and its descriptive elements 205 (described below), to the SIGCAT system 120. The SIGCAT system 120 performs automatic categorization of the IDPS signature 156 (as the sole signature 190-1 from the source IDPS system 140 or as one of multiple signatures 190 from the source IDPS system 140), using the signatures 195 (and their corresponding descriptive elements 205) from the target IDPS system 145, through techniques described below. In one example, the automatic categorization forms the categorized signature mapping 185 from source to target signatures, such that the source signature 158 maps to the target signature 168. This is illustrated by entry 193 in the mapping 185. The SIGCAT system 120 forwards the activity information 157 with the (target) signature 195-1 to the target IDPS system 145.

The activity information 157 (and the signature 195-1) is to be used by the target IDPS system 145 (e.g., via the IDPS management server 111) to determine whether an intrusion has occurred and whether an alert 142 should be generated. An analyst 141 (that is, a human being) uses the IDPS console 131 to analyze the alerts 142 presented to the analyst 141 by the IDPS console 131 and via (in this example) the IDPS management server 111. The analyst 141 can then decide what if anything should be done about the alerts and can take remedial action (or cause remedial action to be taken by the source IDPS system(s) 140 and/or target IDPS system 145). It is further noted that no analyst may be needed (depending on the type of event) and the IPDS system may take action. The alerts 142 are created by the IDPS management server 111 based on the activity information 157 with the signature 195-1.

The computer system 120 comprises one or multiple processors 170, one or more multiple memories 180, interface circuitry 188, one or more network (N/W) interfaces (I/F(s)) 118, and one or more user interface elements 183. The computer system 120 is also referred to herein as the SIGCAT system 120, although each such a device is a computer system. The SIGCAT system 120 may include or be connected to the one or more user interface elements 183. The one or more memories 180 may comprise an operating system (OS) 102, a SIGCAT controller 125, signatures 190 from the source IDPS system, signatures 195 from the target IDPS system, and categorized signatures 185 for the target IDPS system. The OS 102 is a collection of software that directs a computer's operations, controlling and scheduling the execution of other programs, and managing storage, input/output, and communication resources. The SIGCAT controller 125 comprises functionality as described herein and comprises computer-readable code that, when executed by the one or more processors 170, cause the computer system 120 to perform the functionality described herein. The SIGCAT controller 125 may also be implemented (in part or completely) as hardware, such as being internal to the one or more processors 170.

The user interface element(s) 183 of the SIGCAT system 120 could be one or more of, e.g., a touch screen, wireless keyboard, motion sensors, mice, trackballs, and the like. The user interface element(s) 183 may also not be used, e.g., if the SIGCAT system 120 is a computer system on a network and is accessed via the network interface(s) 118.

The computer readable memory/memories 180 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memory/memories 180 may be means for performing storage functions. The processor(s) 170 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processor(s) 170 may be means for performing functions, such as controlling the computer system 120 and other functions as described herein.

The network interface(s) 118 may be wired and/or wireless and communicate over the Internet/other network(s) via any communication technique. The user interface elements 183 may include, for instance, one or more of keyboards, mice, trackballs, displays (e.g., touch screen or non-touch screen), and the like. The computer system 120 may be a (virtual) "computer system" formed in the cloud from multiple processors and memories.

It should be noted that the letters M, N, X, and Y have no meanings in FIG. 1. That is, these letters are used solely to illustrate possible differences in numbers of their corresponding entities.

It is noted that FIG. 1 also illustrates another possible implementation, which is where the signature 190-1 and descriptive elements 205 are sent from the source IDPS system(s) 140 to the SIGCAT system 120 (possibly along with an indication that is used to correlate the activity information 157 with the current signature 190-1), and the SIGCAT system 120 forwards the categorized signature 195 to the target IDPS system 145 (e.g., along with the indication). The source IDPS system(s) 140 do not send the activity information 157 to the SIGCAT system 120 and instead send the activity information 157 (and corresponding indication(s) to the target IDPS system 145, which correlates the indication(s) with the activity information 157 in order to determine whether a threat has occurred to computer systems and/or the network in the target IDPS system 145.

In order to automatically categorize IDPS signatures, exemplary techniques herein used by the SIGCAT system 120 may include the following: 1) creating a set of similarity measures of two signatures (belonging to different IDPS systems) from different perspectives (e.g., including but not limited to signature name, keyword, and/or risk level); 2) (e.g., optimally) integrating these measures to generate an overall similarity metric; and 3) using a majority-voting scheme to find a most appropriate category for the target signature. These are explained in more detail in reference to FIG. 2.

Figure 2A:
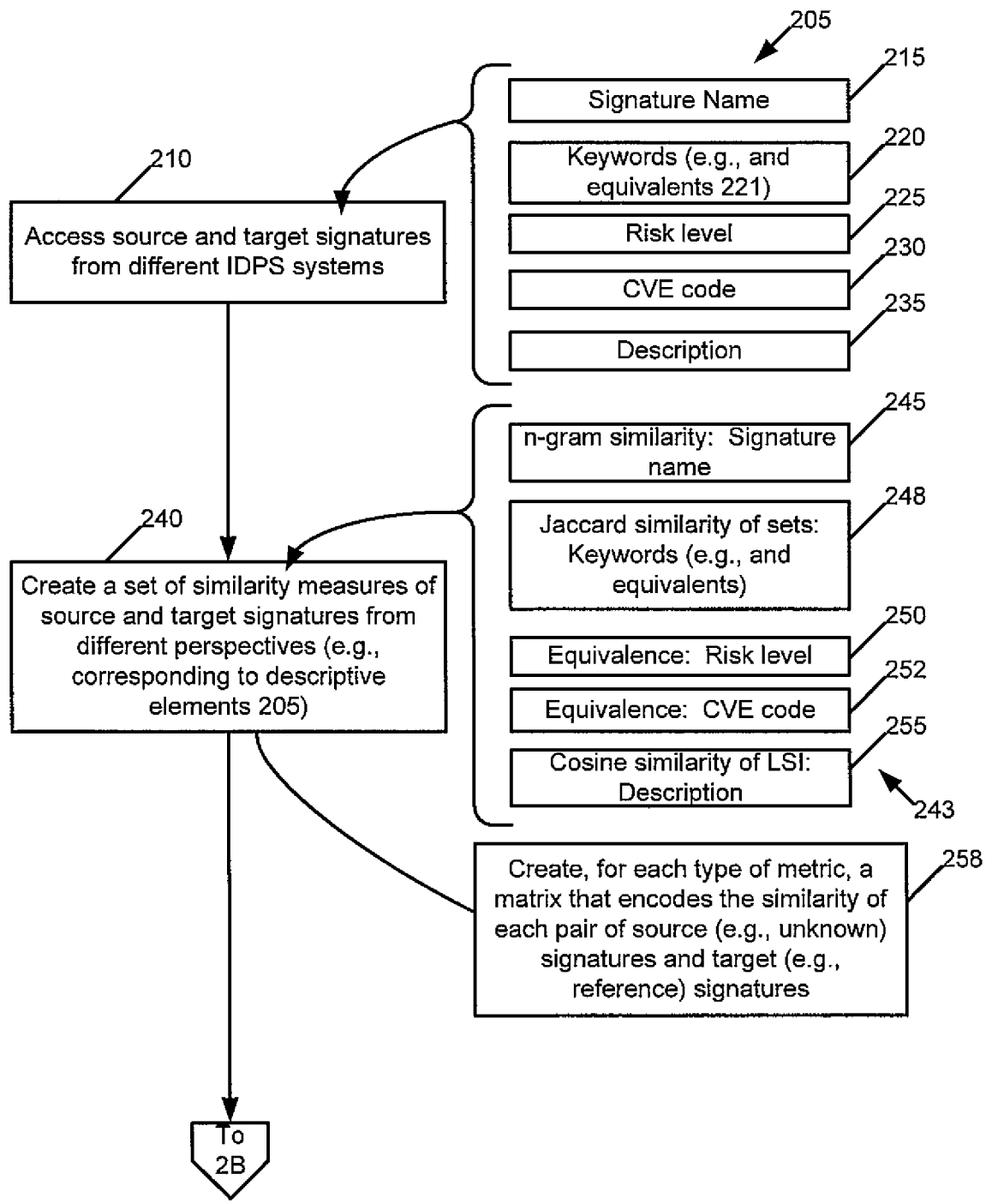
FIGS. 2A and 2B, is a logic flow diagram for automatically categorizing IDPS signatures from multiple different IDPS systems, and illustrates the operation of an exemplary method, a result of execution of computer program instructions embodied on a computer readable memory, functions performed by logic implemented in hardware, and/or interconnected means for performing functions in accordance with exemplary embodiments.
Figure 2B:
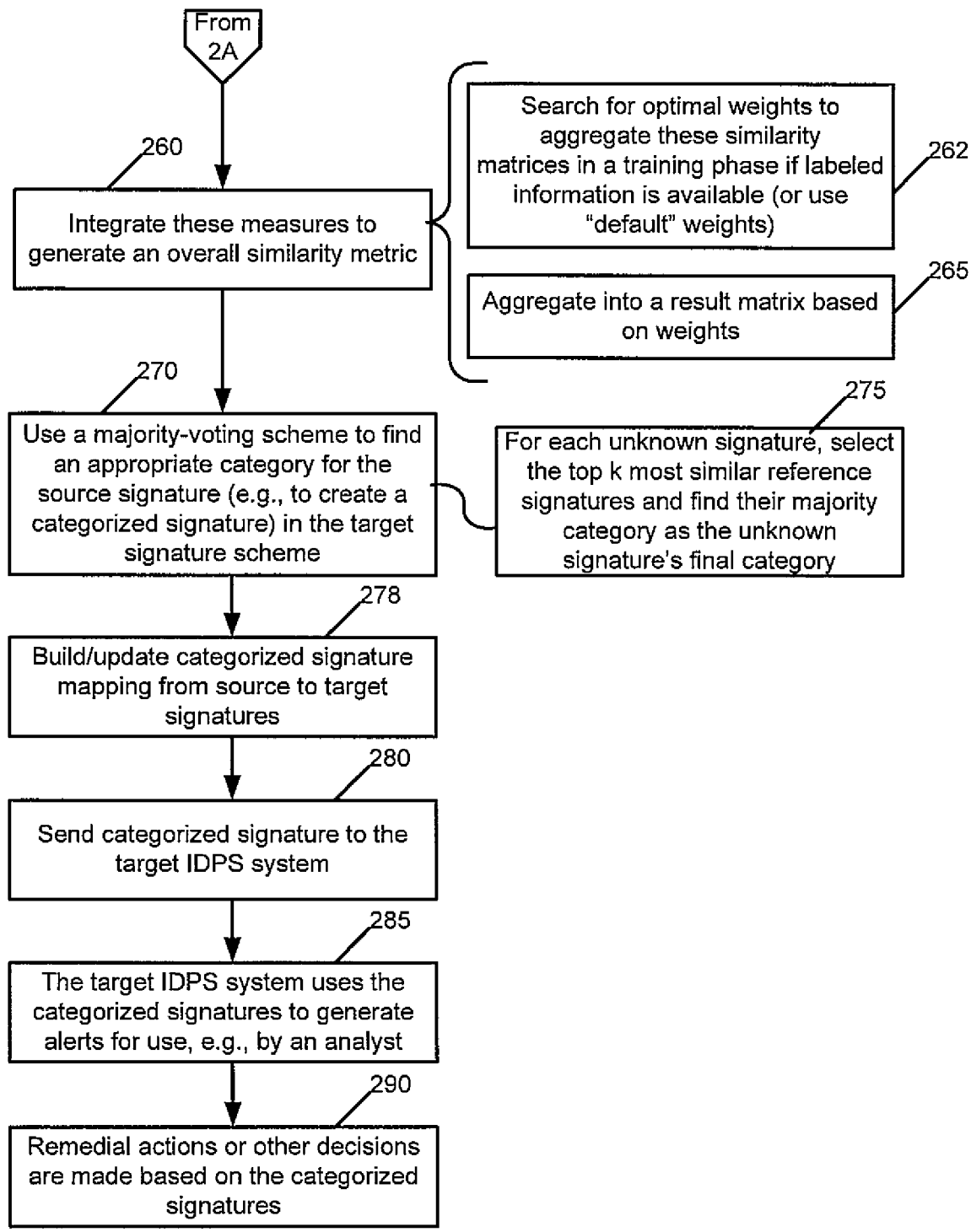

Referring to FIG. 2, this figure includes both FIGS. 2A and 2B and is a logic flow diagram for automatically categorizing IDPS signatures from multiple different IDPS systems. This figure also illustrates the operation of an exemplary method, a result of execution of computer program instructions embodied on a computer readable memory, functions performed by logic implemented in hardware, and/or interconnected means for performing functions in accordance with exemplary embodiments. Blocks 210 through 280 are assumed to be performed by the SIGCAT system 120, e.g., under control at least in part by the SIGCAT controller 125.

In block 210, the SIGCAT system 120 accesses source and target signatures 190, 195, respectively, from different IDPS systems 140, 145, respectively. The signatures can include one or more of the following descriptive elements 205: signature name 215; keywords (e.g., and their equivalents) 220; risk level 225; CVE (Common Vulnerabilities and Exposures) code 230; and a description 235. Each descriptive element 205 contains information describing different aspects of a corresponding signature and may be used to compare and categorize signatures. The signature name 215 is a name used by the vendor for the signature. The keywords 220 are words that help to describe the intrusion related to the signature, such as "BO". The equivalents 221 are words that might be considered to be equivalent to the keywords, such as "buffer overflow" (for BO) and "stack overflow" or "heap overflow". The risk level 225 is typically an indicator that provides indications of risk, such as low, medium, or high. The CVE code 230 provides universal identifiers for vulnerabilities. The description 235 is a more detailed description related to the signature, such as "This is a BO for a computer system".

The descriptive elements 205 are a part (e.g., features) of the signature. The actual signature is an expression (e.g., a regular expression used to scan every packet for matches), which forms the signature along with the descriptive element 205 (e.g., including but not limited to a name and/or risk level). More specifically, each signature indicates a pattern that corresponds to known threats to resources in a computer environment. The resources typically include one or more computer systems (e.g., in a network or networks) and/or one or more networks. The computer system could be any element in a network, such as a gateway, attached storage, or any other network element.

In block 240, the SIGCAT system 120 creates a set of similarity measures 243 of source and target signatures from different perspectives (e.g., corresponding to the descriptive elements 205). The similarity measures 243 may include the following exemplary and non-limiting measures for each set of source and target IDPS signatures 190, 195: n-gram similarity 245 for the signature name 215; Jaccard similarity of sets for the keywords 220 (e.g., and their equivalents 221); equivalence measure 250 for the risk level 225; equivalence measure 252 for the CVE code 230; and cosine similarity of LSI (Latent Semantic Indexing) 255 for the description 235. One possible technique for block 240 is illustrated by block 258, where the SIGCAT system 120 creates, for each type of metric 215-235), a matrix that encodes the similarity of each pair of source (e.g., unknown) signatures 190 and target (e.g., reference) signatures 195.

In block 260, the SIGCAT system 120 integrates these measures to generate an overall similarity metric. In one example, block 260 is performed using blocks 262 and 265. The SIGCAT system 120 in block 262 searches for optimal weights to aggregate these similarity matrices in a training phase if labeled information is available. Labeled information is, e.g., a set of signatures from different vendors along with the "correspondence" links, i.e., Vendor 1-Signature A=Vendor 2-Signature B, and the like. It is noted that if no labeled information is available, a set of default "weights" could be applied. Note that the training phase is only used for determining the optimal weights to aggregate the matrices (e.g., over the five metrics used in the example of FIG. 2). In block 265, the SIGCAT system 120 aggregates these matrices into a result matrix based on the weights.

The SIGCAT system 120, in block 270, uses a majority-voting scheme to find an appropriate category (in the target signature scheme) for the source signature. That is, the source (also called "unknown") signature 190/190-1 is placed into a category for the signatures 195 of the target IDPS system 145 and may be formed as part of the categorized signature mapping 185 from source to target signatures. The category can be considered to be a target signature or perhaps a group of similar target signatures. In particular, in block 278, the SIGCAT system 120 builds and/or updates the categorized signature mapping 185 from source to target signatures. One technique for performing block 270 is illustrated by block 275, where, for each unknown signature, the SIGCAT system 120 selects the top k most similar reference signatures and find their majority category as its final category. In an example of the SIGCAT system 120, the "k" may be specified by a parameter, e.g., referred to a "Knn"). In block 280, the SIGCAT system 120 sends the categorized signature (e.g., signature 195-1) to the target IDPS system 145.

In block 285, the target IDPS system 145 uses the categorized signature 195-1 to generate one or more alerts 142 for use, e.g., by an analyst. In block 290, remedial actions or decisions are made based on the categorized signatures. For instance, an analyst might view (e.g., on the IDPS console 131) the alerts 142 and determine the alerts 142 do not involve an intrusion, and therefore no remedial action need be taken. On the other hand, the analyst might view (e.g., on the IDPS console 131) the alerts 142 and determine the alerts 142 do involve an intrusion, and cause the source IDPS system 140 and/or the target IDPS system 145 to perform remedial action(s).

There are many known remedial actions or decisions are made based on the categorized signatures. For instance, blacklists or whitelists may be used. A blacklist is a list of discrete entities, such as hosts, TCP or UDP port numbers, ICMP types and codes, applications, usernames, URLs, filenames, or file extensions, that have been previously determined to be associated with malicious activity. Blacklists, also known as hot lists, are typically used to allow IDPSs to recognize and block activity that is highly likely to be malicious, and may also be used to assign a higher priority to alerts that match entries on the blacklists. Some IDPSs generate dynamic blacklists that are used to temporarily block recently detected threats (e.g., activity from an attacker's IP address). A whitelist is a list of discrete entities that are known to be benign. Whitelists are typically used on a granular basis, such as protocol-by-protocol, to reduce or ignore false positives involving known benign activity from trusted hosts. Whitelists and blacklists are most commonly used in signature-based detection and stateful protocol analysis. Furthermore, most IDPSs offer multiple prevention capabilities. The specific capabilities vary by IDPS technology type. IDPSs usually allow administrators to specify the prevention capability configuration for each type of alert. This usually includes enabling or disabling prevention, as well as specifying which type of prevention capability should be used. Some IDPS sensors have a learning or simulation mode that suppresses all prevention actions and instead indicates when a prevention action would have been performed. This allows administrators to monitor and fine-tune the configuration of the prevention capabilities before enabling prevention actions, which reduces the risk of inadvertently blocking benign activity. Additional remedial actions include ending sessions such as TCP sessions, performing inline firewalling (e.g., used to drop or reject suspicious network activity), throttling of bandwidth usage (to limit the percentage of network bandwidth a protocol can use), altering malicious content (such as sanitizing part of a packet, which means that malicious content is replaced with benign content and the sanitized packet sent to its destination), reconfiguring other network security devices (e.g., to block certain types of activity or route it elsewhere), or running a third-party program or script (such as running an administrator-specified script or program when certain malicious activity is detected, which could trigger any prevention action desired by the administrator, such as reconfiguring other). Many other options are possible. See, e.g., NIST (National Institute of Standards and Technology), Guide to Intrusion Detection and Prevention Systems (IDPS), Special Publication 800-94, 2007, for this and additional information about IDPS systems.

In the above description, the SIGCAT system 120 acted as an intermediary between source IDPS system(s) 140 and a target IDPS system 145. This is, however, only one example and others are possible. For instance, FIGS. 3 and 4, described below, illustrate another example of an implementation, where a SIGCAT system 320 is a system to which an analyst 141 connects/uses to analyze activity information for IDPS systems.

Figure 3:
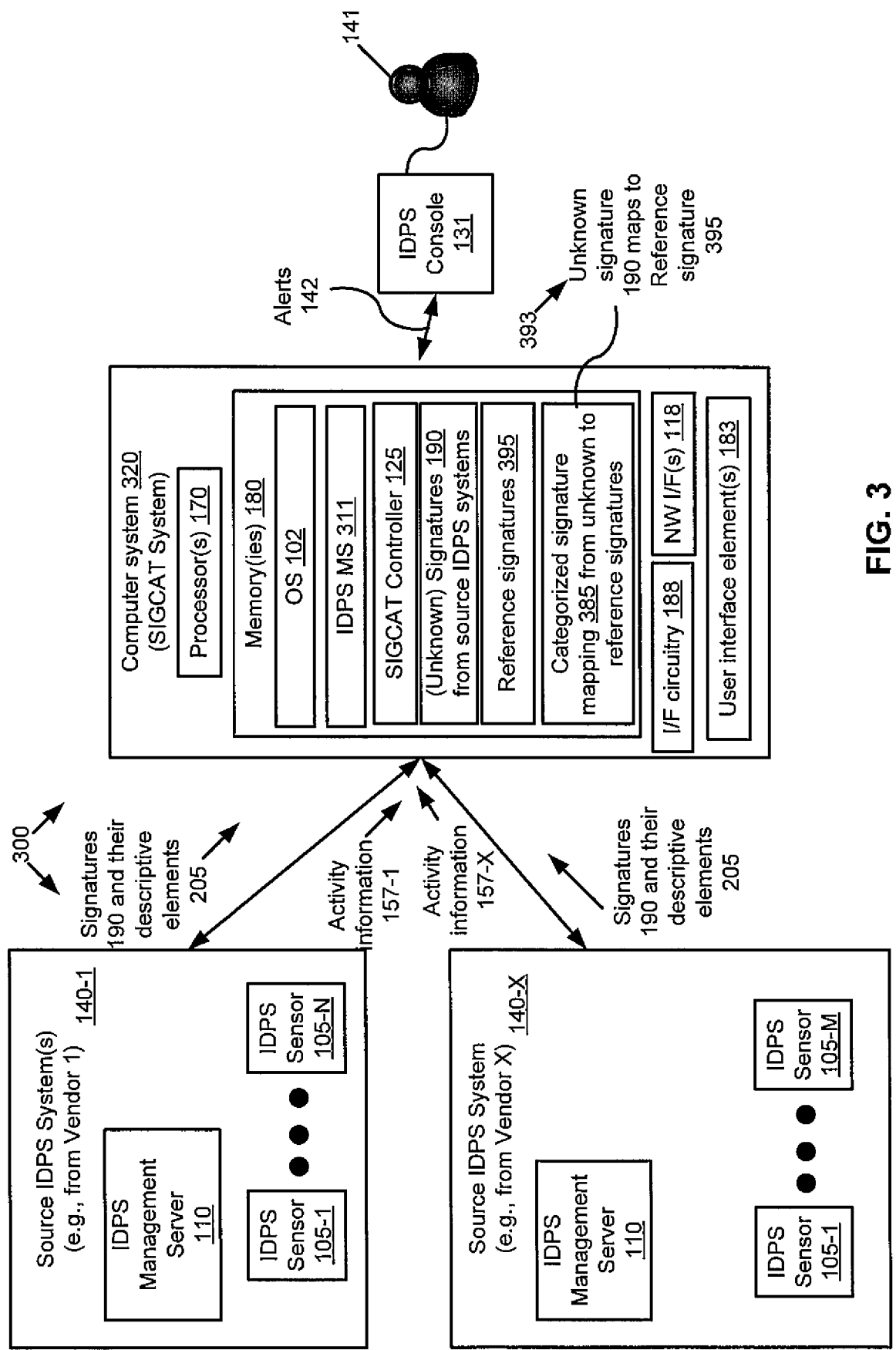
FIG. 3 illustrates another exemplary system used for automatically categorizing IDPS signatures from multiple different IDPS systems in an exemplary embodiment.

In the example of FIG. 3, this figure illustrates another exemplary system 300 used for automatically categorizing IDPS signatures from multiple different IDPS systems in an exemplary embodiment. In FIG. 3, there is a set of reference signatures 395, which have been previously defined, e.g., via a configuration procedure. The configuration procedure may be performed in part or completely by the analyst 141. The SIGCAT system 320 receives signatures 190 from the source IDPS systems 140-1 through 140-X and performs signature categorization based on the reference signatures 395. The signatures 190 are referred to as unknown signatures. This categorization process creates the categorized signature mapping 385 from unknown to reference signatures 395. That is, the automatic categorization performed by the SIGCAT system 320 forms the categorized signature mapping 385 from unknown signatures 190 to reference signatures 395, such that the source signature 158 maps to the target signature 168. This is illustrated by entry 393 in the mapping 385. Unlike in FIG. 1, where the SIGCAT system 120 forwards the activity information 157 with the (target) signature 195-1 to the target IDPS system 145, in FIG. 3, there is an IDPS management server (MS) 311 that determines whether an intrusion has occurred and whether an alert 142 should be generated.

Figure 4A:
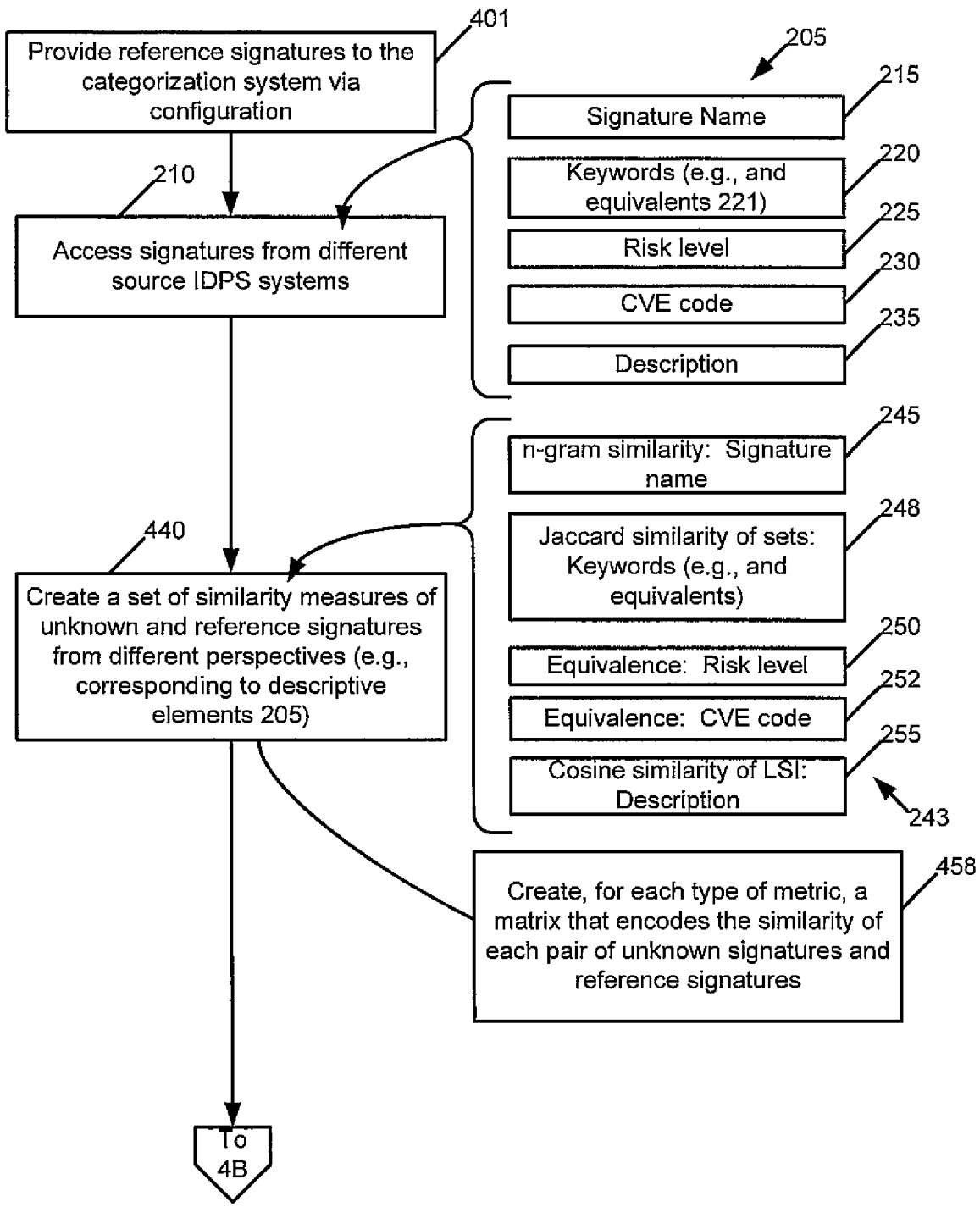
FIGS. 4A and 4B, is another logic flow diagram for automatically categorizing IDPS signatures from multiple different IDPS systems, and illustrates the operation of an exemplary method, a result of execution of computer program instructions embodied on a computer readable memory, functions performed by logic implemented in hardware, and/or interconnected means for performing functions in accordance with exemplary embodiments.
Figure 4B:
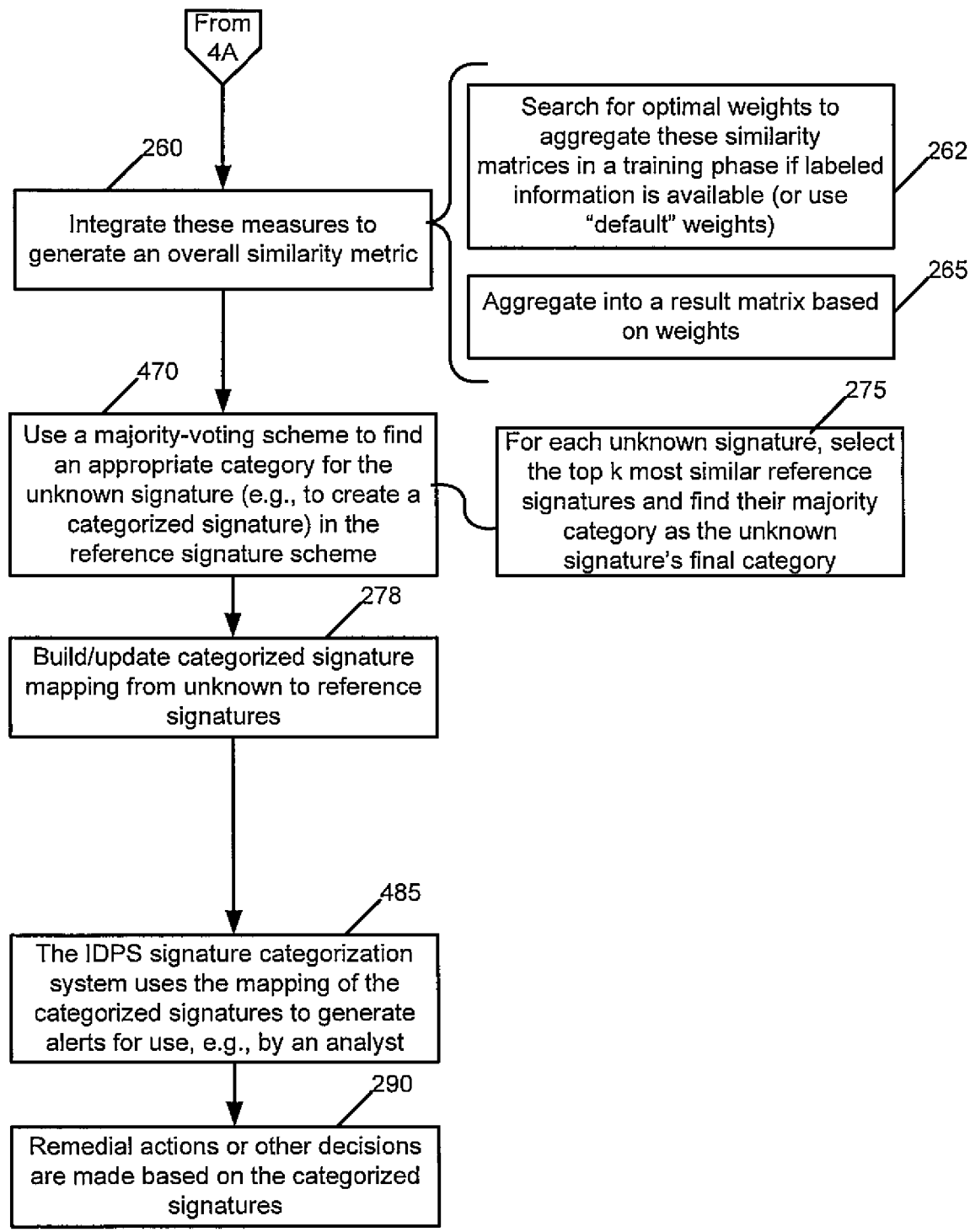

Because there is no target IDPS system 145, and instead the system 300 uses reference signatures 395, the flow from FIG. 2 is modified. This is illustrated by FIG. 4, which includes both FIGS. 4A and 4B, and is another logic flow diagram for automatically categorizing IDPS signatures from multiple different IDPS systems. FIG. 4 also illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 4 are assumed to be performed mainly by the SIGCAT system 320, e.g., under control of the SIGCAT controller 125 at least in part. Most of the blocks in FIG. 2 have already been described in reference to FIG. 2, so mainly the blocks that are different between FIGS. 2 and 4 are described now.

Because there is no target system 145, there is a need to have reference signatures 395 into which the SIGCAT system 320 can categorize the unknown signatures 190 from the source IDPS systems 140. Thus, in block 401, reference signatures 395 are provided to the SIGCAT system 320 via configuration. For instance, the analyst 141 could upload the reference signatures 395 and their corresponding definitions or otherwise interact with the SIGCAT system 320 to provide a set of reference signatures 395. The signatures/categories can be brought into the system in any number of ways, such as being uploaded to, configured in, or copied into the system, and the like. These reference signatures 395 act like the target signature 195 in FIGS. 1 and 2. In block 440, the SIGCAT system 320 creates a set of similarity measures of unknown and reference signatures from different perspectives (e.g., corresponding to similarity descriptive elements 205). In block 458, the SIGCAT system 320 creates, for each type of metric, a matrix that encodes the similarity of each pair of unknown signatures 190 and reference signatures 395. In block 470, the SIGCAT system 320 uses a majority-voting scheme to find an appropriate category for the unknown signature 190 (e.g., to create a categorized signature) in the reference signature scheme. That is, an unknown signature 190 is placed into a category for the reference signatures 395 of the SIGCAT system 320 and may be formed as part of the categorized signature mapping 385 from unknown to reference signatures.

As compared with FIG. 2, in FIG. 4, the SIGCAT system 320 does not send categorized signatures to a target system (see block 280 of FIG. 2). Instead, the SIGCAT system 320 has the IDPS management server (MS) 311 analyze the activity information 157-1 through 157-X based on the categorized signature mapping 385. See block 485, where the SIGCAT system 320 uses the mapping of the categorized signatures to generate alerts for use, e.g., by an analyst. In fact, it should be possible that once the categorized signature mapping 385 is built (e.g., for all possible unknown and reference signatures), the source IDPS systems 140 would send only the signatures 190 and activity information 157, and the IDPS MS 311 would use the categorized signature mapping 385 to convert unknown signatures 190 into reference signatures 395 to generate alerts 142, Note that this is also applicable to FIG. 1, as once the categorized signature mapping 385 is built (e.g., for all possible source and target signatures), the SIGCAT system 120 could simply use the categorized signature mapping 185 to convert from source to target signatures, and such target signatures 195 are sent (e.g., along with activity information 167) to the target IDPS system 145.

Figure 5:
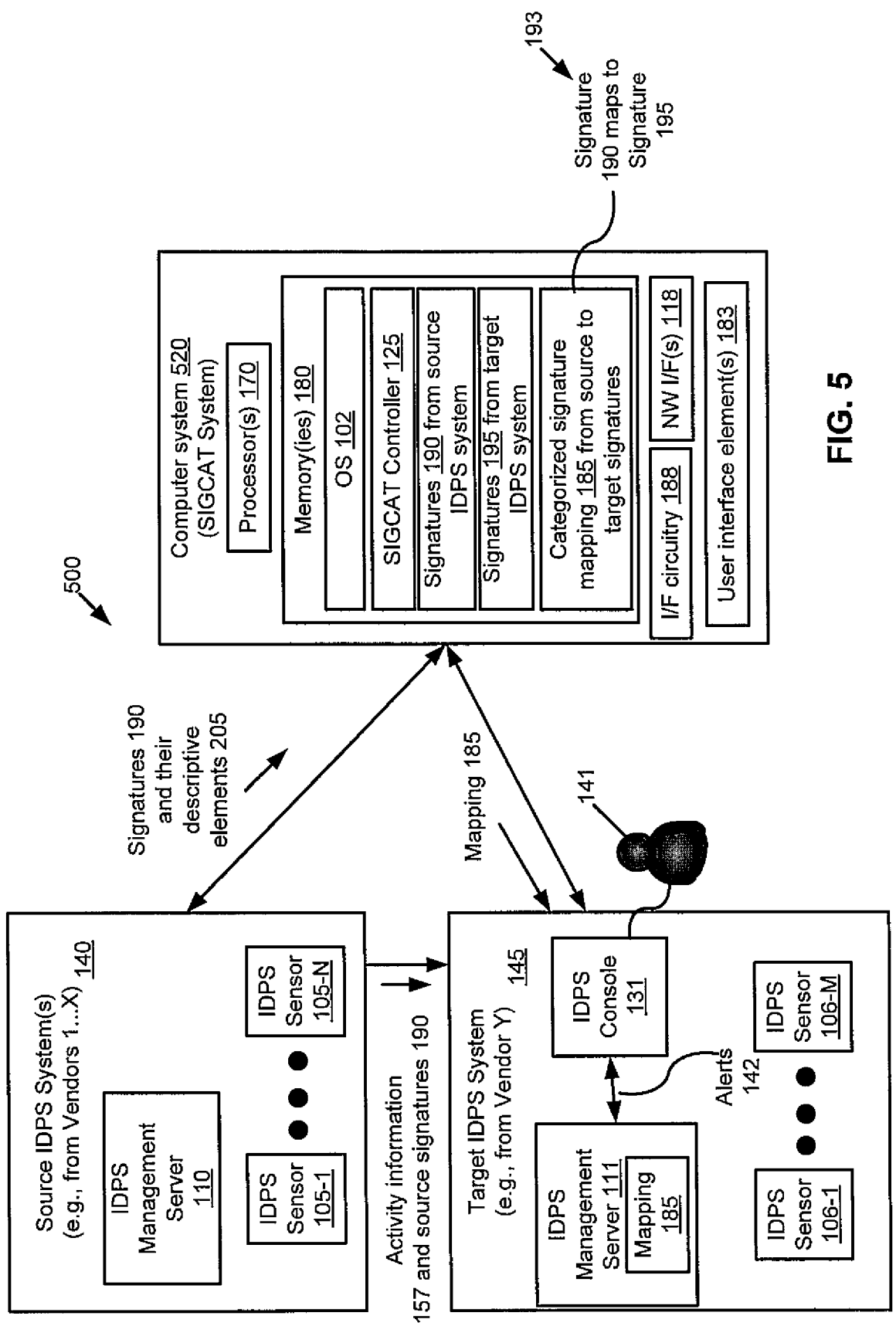
FIG. 5 illustrates another exemplary system used for automatically categorizing IDPS signatures from multiple different IDPS systems in an exemplary embodiment.
Figure 6:
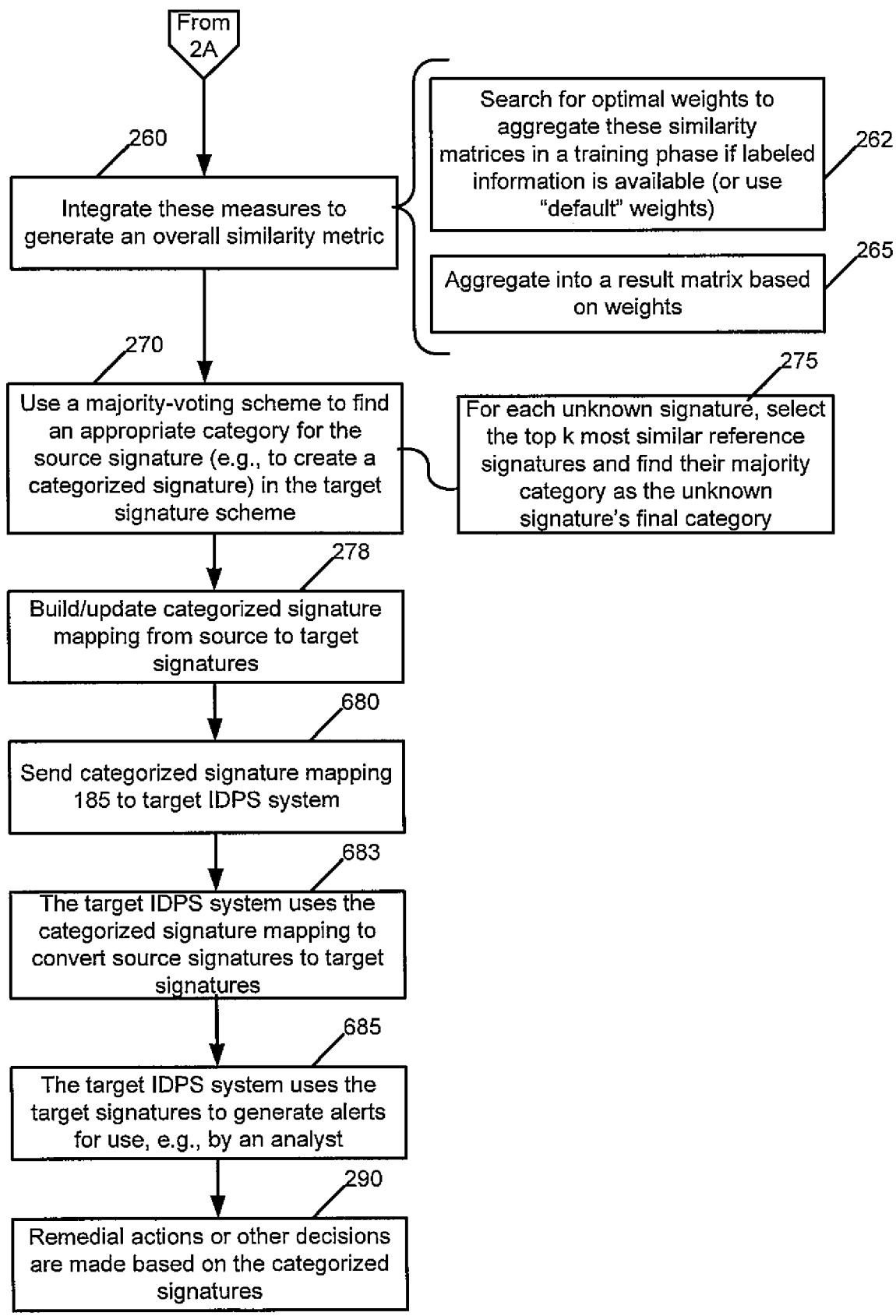
FIG. 6 is a version of FIG. 2B used with the system in FIG. 5, is part of a logic flow diagram for automatically categorizing IDPS signatures from multiple different IDPS systems, and illustrates the operation of an exemplary method, a result of execution of computer program instructions embodied on a computer readable memory, functions performed by logic implemented in hardware, and/or interconnected means for performing functions in accordance with exemplary embodiments.

FIGS. 5 and 6 illustrate another possibility. FIG. 5 illustrates a system 500 similar to the system 100 in FIG. 1. FIG. 6 is a version of FIG. 2B used with the system in FIG. 5. Only differences between FIGS. 1 and 5 and 2B and 6 are described here. In this situation, the SIGCAT system 520 receives signatures 190 and their corresponding descriptive elements 205 from the X source IDPS systems 140. The SIGCAT system 520 determines the categorized signature mapping 185 from the source signatures 190 to the target signatures. The SIGCAT system 520 sends (block 680 of FIG. 6) the resultant categorized signature mapping 185 to the target IDPS system 145. The source TOPS system 140 also sends activity information 157 and corresponding source signatures 190 to the target IDPS system 145. The target IDPS system 145 then uses the categorized signature mapping 185 to convert (block 683 of FIG. 6) source signatures 190 to target signatures 195. In block 685, the target IDPS system 145 uses the target signatures to generate alerts for use, e.g., by analyst 141.

The present invention may be a system, a method, and/or a computer program product at any possible technical detail level of integration. The computer program product may include a computer readable storage medium (or media) having computer readable program instructions thereon for causing a processor to carry out aspects of the present invention.

Compared with existing techniques, the SIGCAT system 120 distinguishes itself in at least the following aspects:

1. The SIGCAT system 120 can account for comprehensive information (illustrated above as similarity descriptive elements 205 including signature name, CVE code, keywords, risk level, and description of signatures from their definitions. Also, the system is fully extensible by providing mechanisms that account for other types of information.

2. All the settings of the SIGCAT system 120 are fully configurable through several property files.

3. The parameters of the SIGCAT system 120 can be automatically tuned if any labeled information (e.g., 205) is available. The parameters are the weights used to aggregate the similarity matrices for all the similarity measures 243 according to the comprehensive information described above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    accessing source and target signatures, wherein the source and target signatures indicate patterns that comprise a plurality of descriptive elements having information describing different aspects of a corresponding signature;
    creating a set of similarity measures of the source and target signatures,
        wherein the source signatures come from a source intrusion and detection system and the target signatures come from a different target intrusion and detection system,
        wherein the source signatures and the target signatures correspond to known threats to resources in a corresponding computer environment of their respective different source or target intrusion and detection system, and
        wherein the source signatures and target signatures have different sets of descriptive elements;
    integrating the set of similarity measures to generate an overall similarity metric;
    using the overall similarity metric to find appropriate categories in the target signatures into which the source signatures should be placed;
    placing the source signatures into the appropriate categories to create a mapping from the source signatures to the target signatures, the mapping being from source signatures used by the source intrusion and detection system to target signatures used by the target intrusion and detection system; and
    sending the mapping to the target intrusion and detection system to determine whether a threat has occurred to the resources in the computer environment for the target intrusion and detection system.

2. The method of claim 1, wherein using the overall similarity metric to find appropriate categories comprises using a majority-voting scheme for the overall similarity metric to find the appropriate categories in the target signatures.

3. The method of claim 2, wherein using a majority-voting scheme for the overall similarity metric further comprises, for each source signature, selecting a top k most similar target signatures and finding their majority category as the source signature's final category.

4. The method of claim 1, wherein the similarity measures comprise similarity matrices and integrating further comprises:
    searching for optimal weights to aggregate the similarity matrices in a training phase if labeled information is available or using default weights if labeled information is not available; and
    aggregating the similarity matrices into a result matrix based on the optimal weights.

5. The method of claim 1, wherein the descriptive elements comprise for each signature one or more of the following: signature name, keywords, risk level, common vulnerabilities and exposures code, and a description.

6. The method of claim 1, wherein creating a set of similarity measures of the source and target signatures from different perspectives comprises performing one or more of the following:
    using a n-gram similarity on one or more of the descriptive elements for the source and target signatures;
    using Jaccard similarity on one or more of the descriptive elements for the source and target signatures;
    using an equivalence measure on one or more of the descriptive elements for the source and target signatures; and
    using cosine similarity of latent semantic indexing on one or more of the descriptive elements for the source and target signatures.

7. The method of claim 1, wherein:
    the method further comprises using the mapping to convert source signatures from one or more source intrusion detection and prevention systems into target signatures for the target intrusion detection and prevention system and sending the target signatures that have been converted to the target intrusion detection and prevention system for use by the target intrusion detection and prevention system for determining whether a threat has occurred to the resources in the one or more source intrusion detection and prevention systems.

8. The method of claim 1, further comprising determining, by the target intrusion and detection system, whether a threat has occurred to the resources in the computer environment of the target intrusion and detection system by using at least the mapping.

9. The method of claim 8, further comprising the target intrusion and detection system outputting one or more alerts in response to a determination the threat has occurred to the resources in the computer environment.

10. The method of claim 9, wherein outputting the one or more alerts comprises outputting the one or more alerts to a console viewable by an analyst.

11. The method of claim 8, further comprising performing, in response to a determination a threat has occurred, one or more remedial actions concerning the resources in the computer environment of the target intrusion and detection system.

12. The method of claim 1, wherein the resources in the computer environment comprise one or more of the following: one or more computer systems or one or more computer networks.

13. A computer system, comprising:
one or more memories storing computer-readable code; and
one or more processors, wherein the one or more processors, in response to executing the computer-readable code, cause the computer system to perform operations comprising the following:
accessing source and target signatures, wherein the source and target signatures indicate patterns that comprise a plurality of descriptive elements having information describing different aspects of a corresponding signature;
creating a set of similarity measures of the source and target signatures, wherein the source signatures come from a source intrusion and detection system and the target signatures come from a different target intrusion and detection system, wherein the source signatures and the target signatures correspond to known threats to resources in a corresponding computer environment of their respective different source or target intrusion and detection system, and wherein the source signatures and target signatures have different sets of descriptive elements;
integrating the set of similarity measures to generate an overall similarity metric;
using the overall similarity metric to find appropriate categories in the target signatures into which the source signatures should be placed;
placing the source signatures into the appropriate categories to create a mapping from the source signatures to the target signatures, the mapping being from source signatures used by the source intrusion and detection system to target signatures used by the target intrusion and detection system; and
sending the mapping to the target intrusion and detection system to determine whether a threat has occurred to the resources in the computer environment for the target intrusion and detection system.

14. A method, comprising:
receiving in a target intrusion and detection system, a mapping from source to target signatures, wherein the source signatures came from a source intrusion and detection system and the target signatures came from the target intrusion and detection system and the source and target intrusion and detection systems are different, wherein the source and target signatures indicate patterns that correspond to known threats to resources in a corresponding computer environment of their respective different source or target intrusion and detection system, and wherein the source signatures and target signatures had different sets of descriptive elements;
converting, by the target intrusion and detection system, from the source signatures to the target signatures by using the mapping between source and target signatures; and
using the target signatures, which have been converted from the source signatures using the mapping, to determine whether a threat has occurred to the resources in the computer environment of the target intrusion and detection system; and
outputting by the target intrusion and detection system one or more alerts in response to a determination the threat has occurred to the resources in the computer environment of the target intrusion and detection system.

15. The method of claim 14, further comprising, prior to accessing the target signatures, converting the source signatures to the target signatures by using the mapping between source and target signatures.

16. The method of claim 14, wherein the mapping has been previously determined using the following:
creating a set of similarity measures of the source and target signatures from different perspectives, each perspective corresponding to a descriptive element;
integrating the set of similarity measures to generate an overall similarity metric;
using the overall similarity metric to find most appropriate categories in the target signatures into which the source signatures should be placed; and
placing the source signatures into the appropriate categories to create the mapping from the source signatures to the target signatures.

17. The method of claim 16, wherein using the overall similarity metric to find appropriate categories comprises using a majority-voting scheme for the overall similarity metric to find the appropriate categories in the target signatures.

18. The method of claim 16, wherein the similarity measures comprise similarity matrices and integrating further comprises:
searching for optimal weights to aggregate the similarity matrices in a training phase if labeled information is available or using default weights if labeled information is not available; and
aggregating the similarity matrices into a result matrix based on the optimal weights.

19. The method of claim 16, wherein the descriptive elements comprise for each signature one or more of the following: signature name, keywords, risk level, common vulnerabilities and exposures code, and a description.

20. The method of claim 16, wherein creating a set of similarity measures of the source and target signatures from different perspectives comprises performing one or more of the following:
using a n-gram similarity on one or more of the descriptive elements for the source and target signatures;
using Jaccard similarity on one or more of the descriptive elements for the source and target signatures;
using an equivalence measure on one or more of the descriptive elements for the source and target signatures; and
using cosine similarity of latent semantic indexing on one or more of the descriptive elements for the source and target signatures.

* * * * *